US009111357B2

(12) United States Patent
Brossette et al.

(10) Patent No.: US 9,111,357 B2
(45) Date of Patent: Aug. 18, 2015

(54) SYSTEM AND METHOD OF PILL IDENTIFICATION

(75) Inventors: Stephen E. Brossette, Vestavia, AL (US); Patrick A. Hymel, Jr., Mountain Brook, AL (US)

(73) Assignee: MedSnap, LLC, Birmingham, AL (US)

( * ) Notice: Subject to any disclaimer, the term of this patent is extended or adjusted under 35 U.S.C. 154(b) by 431 days.

(21) Appl. No.: 13/490,510

(22) Filed: Jun. 7, 2012

(65) Prior Publication Data

US 2013/0329058 A1     Dec. 12, 2013

(51) Int. Cl.
H04N 5/225      (2006.01)
G06K 9/00       (2006.01)
G06T 7/00       (2006.01)

(52) U.S. Cl.
CPC ..... *G06T 7/0083* (2013.01); *G06T 2207/20136* (2013.01); *G06T 2207/30108* (2013.01)

(58) Field of Classification Search
USPC ................. 348/207.1; 382/165, 100, 225
See application file for complete search history.

(56) References Cited

U.S. PATENT DOCUMENTS

| 8,682,047 B2 * | 3/2014 | Lang et al. ............ 382/128 |
| 2010/0278382 A1 | 11/2010 | Chapman |
| 2011/0170786 A1 | 7/2011 | Naini |

FOREIGN PATENT DOCUMENTS

WO     2007047004 A2     4/2007

OTHER PUBLICATIONS

Andreas Hartl, Computer-Vision Based Pharmaceutical Pill Recognition on Mobile Phones, Proceedings of CESCG 2010: The 14th Central European Seminar on Computer Graphics, pp. 8.
Andreas Hartl, Instant Medical Pill Recognition on Mobile Phones, Clemens Arth, Dieter Schmalstieg, Institute for Computer Graphics and Vision, Graz University of Technology, Austria, (8) pages.
Yin, Dong, et al., "Technology of Dispensing Check Based-on Tablet Features," Artifical Intelligence, Management Science and Electronic Commerce (AIMSEC), 2011 2nd International Conference on, IEEE, Aug. 8, 2011, pp. 2460-2462, XP031964050.
Hou, Haifei, et al., "An Effective Method for Extracting Capsule by Color Image Processing," Information Technology, Computer Engineering and Management Sciences (ICM), 2011 International Conference on, IEEE, Sep. 24, 2011, pp. 295-298, XP032083047.
International Search Report for PCT/US2013/044462 dated Sep. 10, 2013.

* cited by examiner

*Primary Examiner* — Joel Fosselman
(74) *Attorney, Agent, or Firm* — Holland & Hart LLP

(57) ABSTRACT

A system and method for identifying pills by determining a size and shape of each pill in a digital image. The system includes a background grid organized as a grid of alternating-colored shapes. The system also includes a digital camera, a processor and a memory. The processor is used to receive and process the digital image taken by the digital camera so as to determine contours for each pill in the image. The contour determination is refined and is used to determine size and shape information for each pill.

54 Claims, 17 Drawing Sheets

SYSTEM AND METHOD OF PILL IDENTIFICATION

FIELD OF THE INVENTION

The disclosed embodiments relate to digital image processing for identification of pills, and specifically to the determination of contours for each pill in a digital image so as to facilitate identification of each pill.

BACKGROUND OF THE INVENTION

Pills of many shapes, sizes and colors are available as both prescription and non-prescription medications. In the United States, the physical identifiers of solid dosage pharmaceuticals are approved by the Federal Drug Administration. Ideally, no two pills are approved to have exactly the same identifiers. Thus, pills are approved to each have a unique combination of shape, size, color, imprint (i.e., characters or numbers printed on the medication), and/or scoring. Nevertheless, despite the fact that every type of FDA-approved pill is indeed intended to be unique, the differences between pills is sometimes subtle. For example, two pills of the same shape but slightly different colors and/or sizes may easily be confused by a patient. Pills normally differentiated by imprint may not appear to be different at all if the imprints are not visible due to rotation of the pills. Such concerns are exacerbated by the actions of patients who may not be fully coherent or alert.

Patients are not the only individuals who have a need to quickly and easily identify pills. Relatives or caretakers of patients may also have such a need. Their need may stem from their responsibility to provide the correct pills to the patient, or simply from a desire to verify that the patient has taken the correct pills. Hospitals may have a need to quickly identify each of a collection of pills that may have been ingested by a child admitted for accidental ingestion of medication. Pharmacies have an interest in ensuring that correct pills are dispensed. Insurance companies may even have an interest in monitoring medication adherence, ensuring that correct pills are dispensed to and taken regularly by the insured. In other words, many parties have an interest in verifying the identity of pills, whether the pills are identified individually or as a collection of various pills.

Pills can be identified using various photographic and image processing methods. For example, a digital image of a pill or collection of pills can be taken, and then image processing methods can be used to determine how many pills are in the image, the location and boundaries of the pills in the image, and to assign pixels in the image to a potential pill for identification. This process of segmentation ideally results in every pixel in the image either being assigned to a pill with well-defined and accurate boundaries or being disregarded as not belonging to any pill. Once pixels are assigned, the accumulated pixels for a given pill can be analyzed to determine the characteristics of the pill (e.g., its size, shape and color).

However, problems exist in current methods of photographic pill identification. Specifically, current methods of segmentation can result in a single contour enclosing multiple pills. Sometimes, pill contours end up enclosing only portions of a pill instead of the entirety of the pill. And pill contours can be misshapen, rough, or "chewed in," as explained below. These mistakes in segmentation result in pixels being assigned to wrong pills as well as incorrect conclusions regarding the sizes and shapes of imaged pills.

Accordingly, there is a need for an improved method and system of photographic pill identification.

DETAILED DESCRIPTION OF THE INVENTION

In the following detailed description, reference is made to the accompanying drawings, which form a part hereof, and in which is shown by way of illustration specific embodiments that may be practiced. It should be understood that like reference numbers represent like elements throughout the drawings. Embodiments are described with sufficient detail to enable those skilled in the art to practice them. It is to be understood that other embodiments may be employed, and that various structural, logical, and electrical changes may be made without departing from the spirit or scope of the invention.

In order to improve the results obtained through digital image pill identification using segmentation, an improved system and method of segmentation is described below. The embodiments described below include the use of a specific background to facilitate better pixel segmentation. In addition various image processing steps are also disclosed. The disclosed image processing steps include a method of multiple color-based segmentation, a method of combining edge density-based and multiple color-based segmentation information, a "pinch point" method to separate touching pills, and a method of "pill part stitching" to join together parts of multi-segmented pills into single pills. As will be apparent, the disclosed steps may be performed in varying orders. Additionally, the disclosed steps may be implemented by either hardware or software, or a combination thereof.

Figure 1:
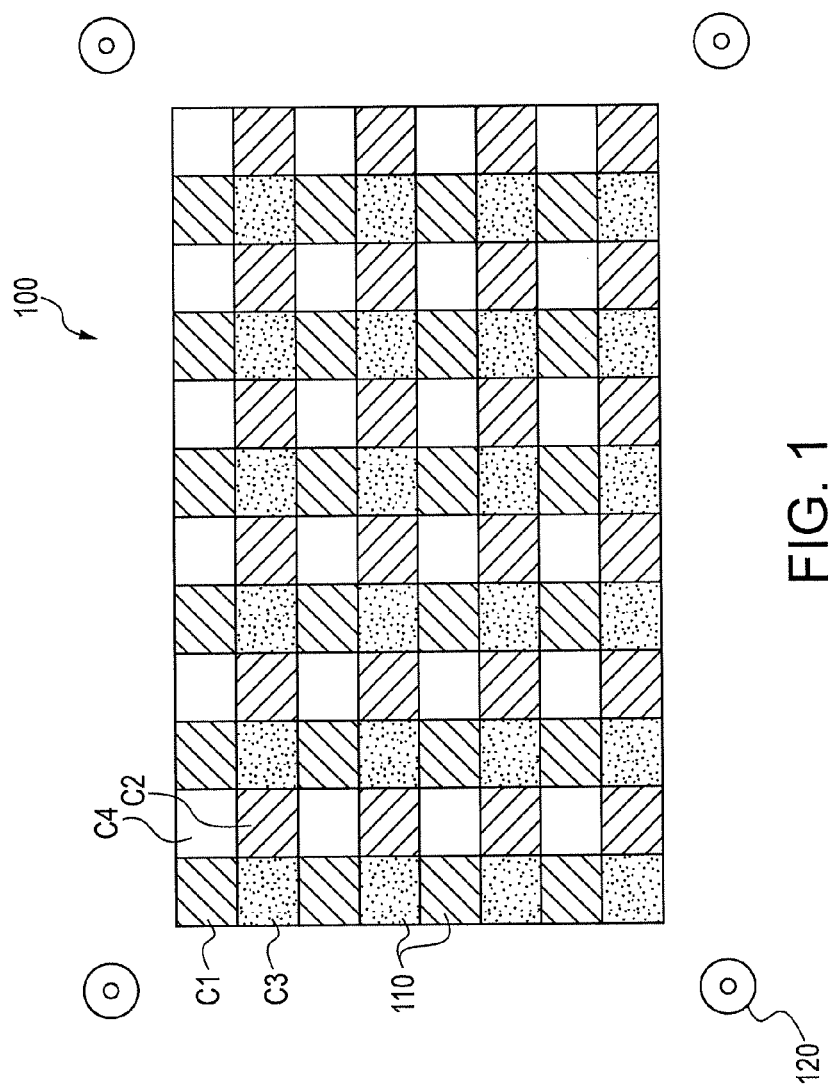
FIG. 1 illustrates a background for pill segmentation and identification, in accordance with the present disclosure.

In the disclosed improved system for digital image segmentation for pill identification, pills are imaged against a background. The background is preferably a multi-color checkerboard background. The checkerboard background includes a tightly-packed, closely-spaced matrix of squares. In an embodiment, the background is a four-color checkerboard, with two-by-two sets of blue, green, white and yellow squares. Other colors may of course be used. FIG. 1 illustrates an example background 100 with a checkerboard pattern. In the example of FIG. 1, the background 100 includes four different colors, with every two-by-two section including one square 110 of each color. Thus, each two-by-two section includes a square 110 of a first color C1, a square 110 of a second color C2, a square 110 of a third color C3 and a square 110 of a fourth color C4. For example, color C1 could be blue, color C2 could be green, color C3 could be white, and color C4 could be yellow. In the example of FIG. 1, each square 110 is the size of a 72 dpi (dots per inch) pixel.

A reason for using the high-density colored checkerboard pattern is to create contrast between an imaged pill and its background. For example, the checkerboard background has a high edge density relative to the edge density of pills. In the described example, a two-by-two sub-grid of squares has an area of $(2/72)^2$ squared-inches and $12/72$ inches of edges. Because pills do not have anything near this type of edge density, the described background can be used for edge-based segmentation, as will be further described below. Additionally, the multiple colors of the background are useful in providing contrast for pills which come in all different types of colors. Because pills come in so many different colors, using a solid-colored background of any color is likely to result in poor contrast between pills that are of the same or close to the same color as the background. However, by subdividing the background into a grid of appropriate dimensions of multiple colors, pills that might normally not be easily resolved because of the similarity in colors of the pills and background are able to be resolved due to the variety of colors in the background. The grid must, of course, include squares that are small enough so that an entire pill cannot fit within a square of a single color. Thus, while the example of FIG. 1 illustrates squares of a specific size, other sizes may be used as long as the pills to be imaged are much larger than the individual square dimensions and as long as the imager (e.g., camera) is capable of resolving the different squares.

While the background 100 of FIG. 1 illustrates a four-color pattern, results can be obtained using a different number of colors, including only two colors, as long as each square differs in color from its immediate neighbor square. Further, the background 100 need not be limited to a matrix of squares. Other background patterns may be used (e.g., diamonds), so long as the dimensions of the background pattern components are of a size appropriate for resolving different-sized pills.

In order for the background variation to be accurately accounted for and used, the background must be precisely aligned when imaged. To assist in the alignment of the background, the background includes targets. In the example of FIG. 1, the background 100 includes four targets 120. The targets 120 have a particular shape, size, and color so as to distinguish them from the background and so as to allow for precise determination of each target's location. As an example, the targets 120 are each a black-rimmed yellow circle, 9 mm in diameter, with a centered 1.5 mm diameter black bull's eye and a small white dot at the center of the bull's eye. Other sizes, shapes and colors may be used for the targets 120. The number, shapes, and colors of targets 120 can also be varied, as long as the targets allow for precise alignment of the background.

Figure 2:
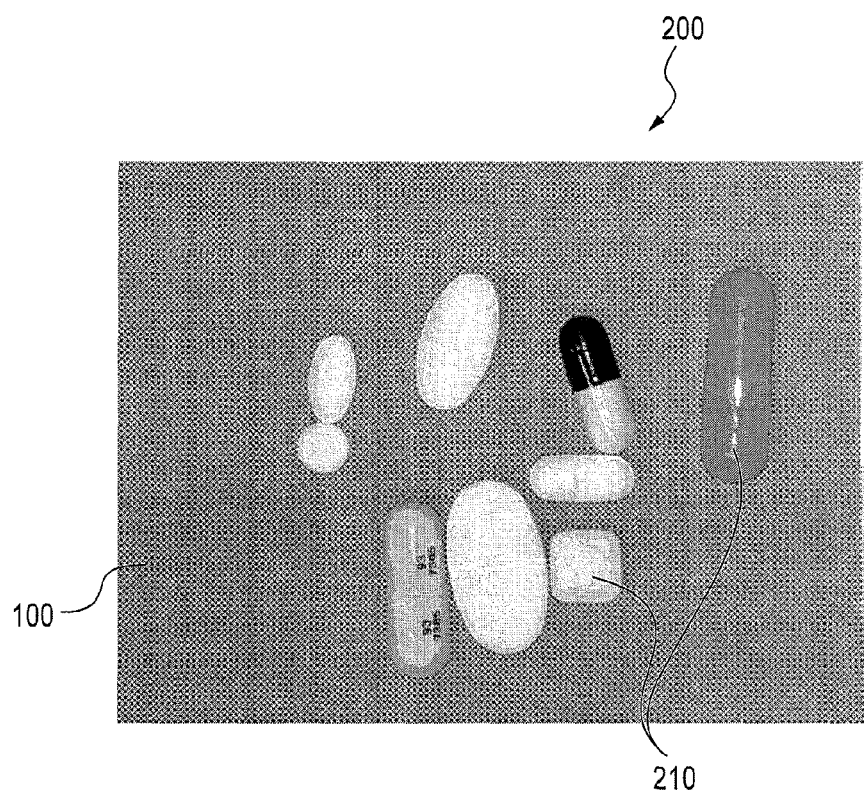
FIG. 2 illustrates an image of pills to be identified, in accordance with the present disclosure.

One or more pills can be identified when imaged on the background 100. Due to the design of the background 100 and the applied image processing steps (to be described below), the pills need not be arranged in any particular orientation on the background 100. Pill identification can occur even when pills are randomly oriented on the background 100 and are touching each other, as is illustrated in the example 200 of FIG. 2. Multiple types of pills 210 can be imaged at a same time and each can be identified.

Once the pills 210 are placed on the background 100 and imaged, various methods are used to segment the pixels in the image so that each pill may be differentiated by its characteristics. A first step in the segmentation is the use of edge density-based segmentation. Edge density-based segmentation relies on the difference in edge density between a background surface with a high edge density (e.g., a sufficiently dense checkerboard or grid) and pills, which have low edge density by comparison.

Figure 3:
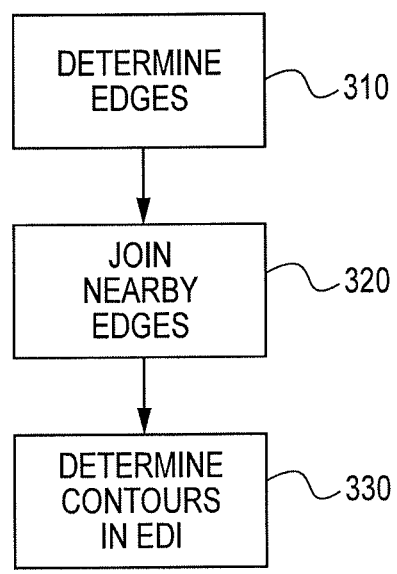
FIG. 3 illustrates an edge density-based segmentation method, in accordance with the present disclosure.
Figure 4:
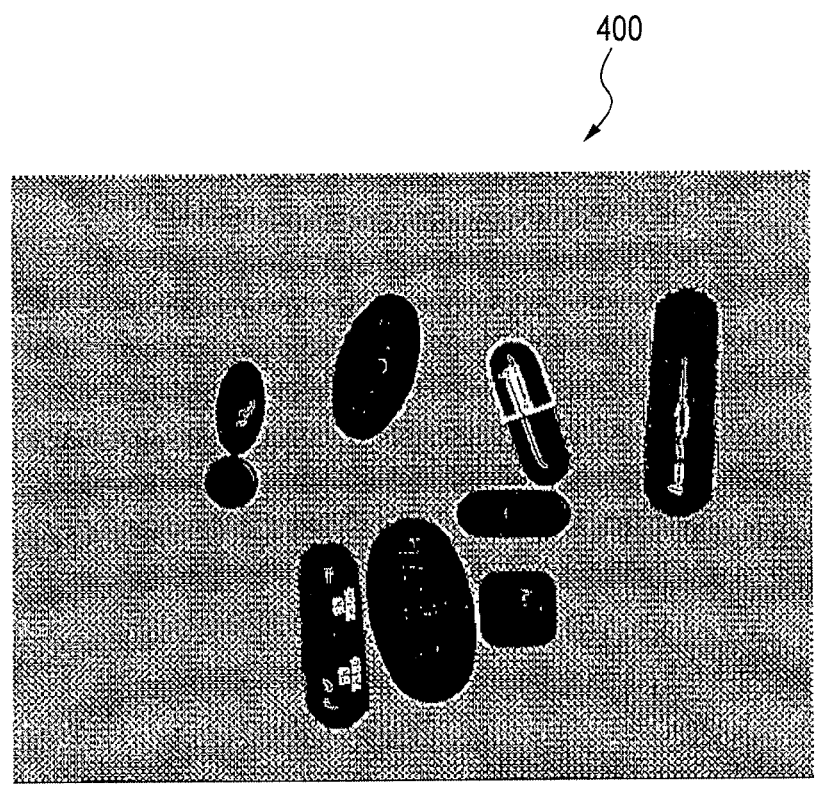
FIG. 4 illustrates an edge density image, in accordance with the present disclosure.

FIG. 3 illustrates an edge density-based segmentation approach 300. The first step 310 is to determine edges that exist in the image. From the original image, edges can be determined by identifying areas of sharp contrast. Just as a human eye can perceive that an edge or boundary exists between regions of different colors, luster, etc., well-known algorithms can also be used by image processors to identify boundaries between different imaged properties and to define the boundary as an edge. Some well-known edge-finding algorithms include the Canny or Adaptive Threshold algorithms. Others may be used as well. The result of the edge-finding algorithm is a modified version of the original image. The modified version is a binary or two color image (generally black (binary 0) and white (binary 1)), with binary 0 representing a background and the binary 1 representing all of the edges found in the original image. For example, in the modified image, all edges found in the original image are represented as white boundaries superimposed on a black background. The modified image is referred to as the edge density image, or EDI. An example edge density image 400 is illustrated in FIG. 4, which is an EDI of the original image 200 of FIG. 2.

The edge density image 400 includes many edges, only a few of which actually relate to pills. For example, every edge on the background grid is included as a white line in the edge density image 400. The pills themselves include relatively few edges, though in edge density image 400, pill imprints and glare are also represented as edges. In order to extract the most relevant edges from the edge density image 400, the EDI 400 is further processed to "join together" nearby edges in the EDI 400. Thus, returning again to FIG. 3, after the edge density image is created at step 310, nearby edges in the edge density image are joined at step 320.

Figure 5:
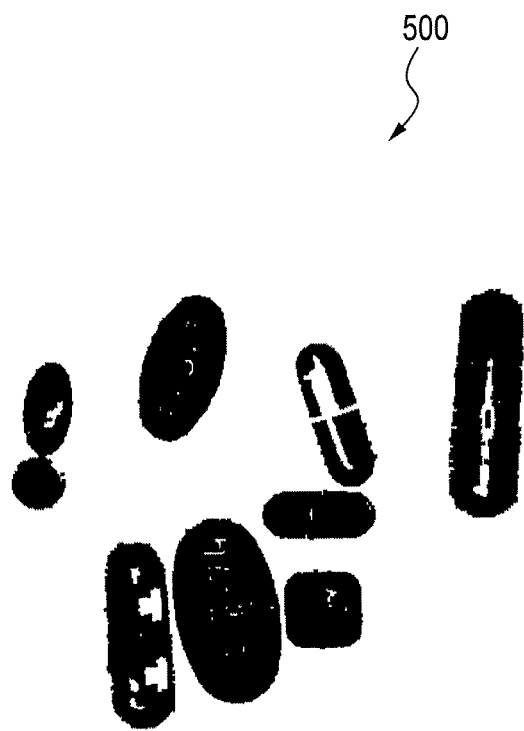
FIG. 5 illustrates a processed edge density image, in accordance with the present disclosure.

Nearby edges are joined together by performing one or more image filtering operations. Useful operations include morphological operations such as DILATE and CLOSE operations. The morphological DILATE operation uses algorithms that "thicken" or dilate the pixels with value "1" in an image. In the example of image 400, the DILATE operation thickens the white regions in the image. The morphological CLOSE operation is used to remove small holes in the foreground, thus changing small islands of binary "0"s to binary "1"s. Accordingly the edge density image 400 can be processed using a morphological DILATE operation to thicken the white boundary lines, meaning that areas of high edge density may become mostly white. Then, to remove the small islands of black background, the morphological CLOSE operation is used. The result is a processed edge density image 500, as illustrated in FIG. 5. The processed edge density image 500 shows the edges most relevant to the pills that are to be identified. Variations of image 500 can be achieved by using other morphological operators such as ERODE and OPEN (in place of DILATE and CLOSE) if the edge density image 400 had reversed its binary color scheme. Regardless of the specific operators used (or other image processing techniques), the result of step 320 is the creation of an image that shows only the most relevant edges.

At step 330 (returning again to the approach 300 of FIG. 3), the processed edge density image 500 is further processed to determine contours. Contours are curves that enclose objects. In the processed edge density image 500, black areas are assumed to be objects of interest, and so contours are used to enclose areas of black. Contours are generated through well-known image processing techniques. In the processed edge density image 500, contours may be created for objects within bigger objects. Such contours are referred to as internal contours and are important in the analysis of internal pill features such as imprints and scores. But for purposes of finding the outermost contours of pills, internal contours are not important. Thus, in generating contours for the processed edge density image 500, only external contours—those not enclosed by other contours—are generated. An example of the contours generated for the processed edge density image 500 is illustrated in the contour image 600 of FIG. 6.

Figure 6:
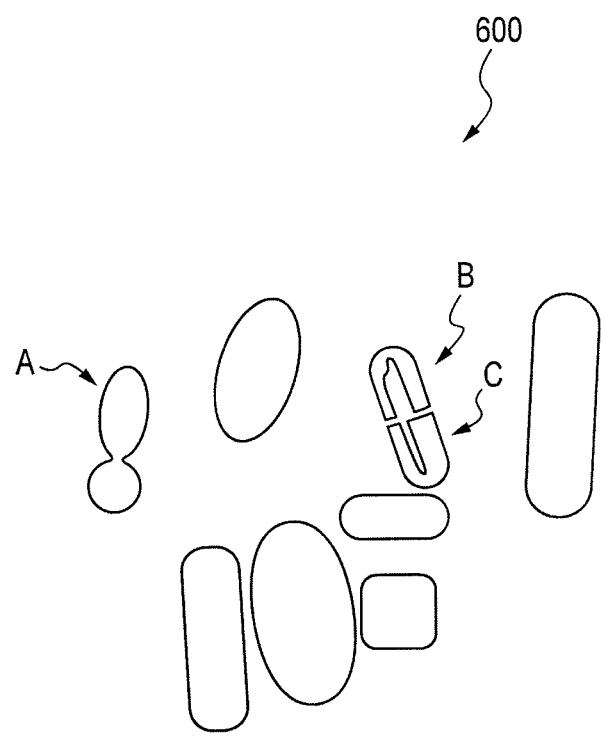
FIG. 6 illustrates a contour image, in accordance with the present disclosure.
Figure 7A:
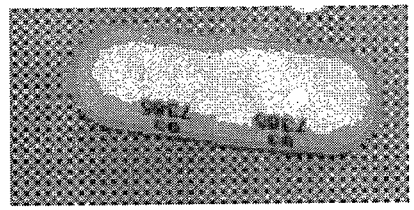
FIGS. 7A-7D illustrate a determination of a "chewed in" pill contour, in accordance with the present disclosure.
Figure 7B:
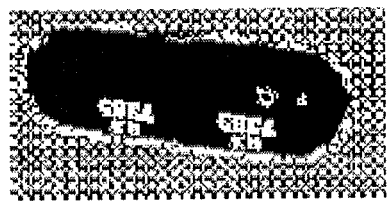
Figure 7C:
Figure 7D:
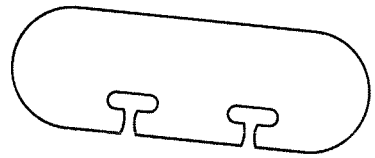

In the contour image 600, contours accurately depict the location of six of the original nine pills in the image. However, contour A encloses two separate pills that had been touching, and contours B and C enclose two parts of the same pill that was scored in the middle. Further, contours can be "chewed in." Glare can sometimes create this problem, as is also illustrated by contours B and C of image 600. Both contours B and C appear to be "chewed in" in what is actually the middle of the imaged capsule. Pill imprints, for example, can also result in "chewed in" edges. As is illustrated in the example of FIG. 7A-D, a capsule with an imprint that appears near an edge, next to the background (as in FIG. 7A) is imaged and processed according to steps 310 (FIG. 7B), 320 (FIG. 7C) and 330 (FIG. 7D) to generate a contour that no longer matches the shape of the imaged pill. Thus, the contours in FIGS. 6 and 7D illustrate some of the limitations of just using the edge density-based segmentation approach 300. The limitations of the edge density-based segmentation approach 300 can be overcome through further processing, as explained below.

The "chewed in" contour problem can be solved through multiple color-based segmentation, or MCBS. MCBS uses color information of the multi-color background 100 to solve this problem. The solution is related to that used in video applications where a green screen is used as a background for an actor in the foreground. In those applications, the green screen background is subtracted from the resultant video or image in order to replace the background with a different background. This can be done as long as the actor is not wearing clothing that is the same green color used in the background. If the actor were to wear a shirt, for example, that was the same color as the background, the shirt would also be subtracted from the resultant image and replaced with the desired background, leaving the actor's head floating unconnected to the actor's arms or legs.

In MCBS, however, the background is not just a single color, but is instead multiple colors. This has the advantage of allowing identification of foreground objects whose color would otherwise be the same as a single-colored background of the same color. Because pills come in many different colors and can be imaged under different lighting conditions, no single background color is ideal for pill segmentation with standard background subtraction methods.

MCBS is used in conjunction with the edge density-based segmentation approach 300 described above. While the approach 300 was described as being carried out using the background 100, nothing in the edge density-based segmentation approach 300 necessarily requires the specific background 100. The usefulness of the background 100 is apparent, however, in the application of MCBS.

As described above, the background 100 must have at least two different colors. Background 100 is illustrated as having four different colors, arranged in a checkerboard pattern that includes 72 dpi squares. Nevertheless, MCBS may be used with only two colors, C1 and C2, for example.

Figure 8:
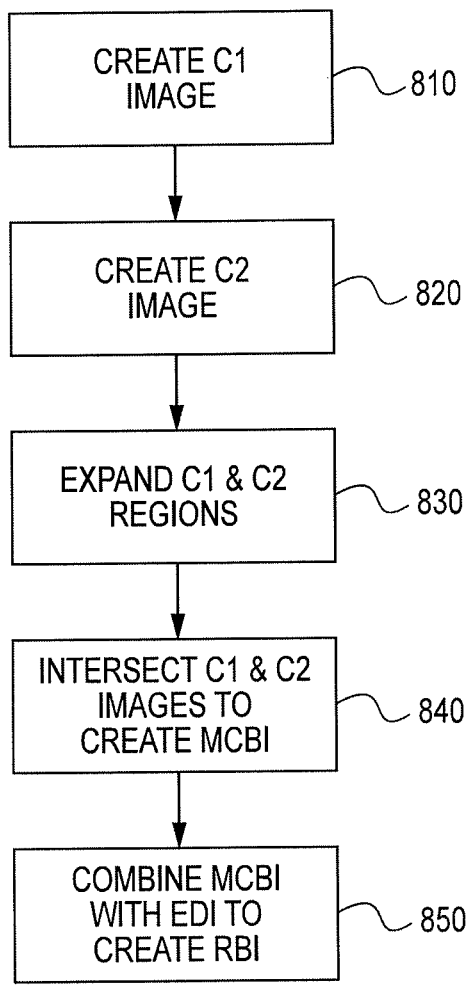
FIG. 8 illustrates a multiple color-based segmentation method, in accordance with the present disclosure.
Figure 9:
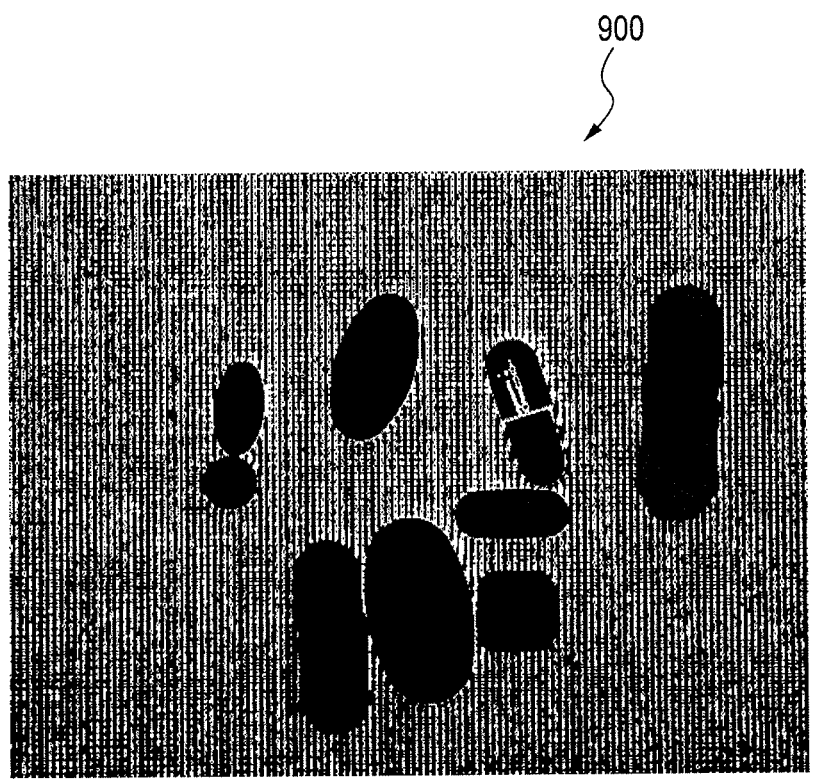
FIG. 9 illustrates a first color binary image, in accordance with the present disclosure.

A method 800 of using MCBS is illustrated in FIG. 8. At step 810, C1-colored pixels in the original image 200 are located and a new binary image called the C1 image is created. The C1 image is a binary image in, for example, black (binary 0) and white (binary 1). The C1 image is the same size as the original image 200, but the pixels of the C1 image represent the presence (or absence) of a C1-colored pixel. For example; a C1 image 900 of original image 200 is illustrated in FIG. 9. The C1 image 900 is black (binary 0) except for those pixels that are C1-colored. The C1-colored pixels are white (binary 1) in the C1 image 900.

Figure 10:
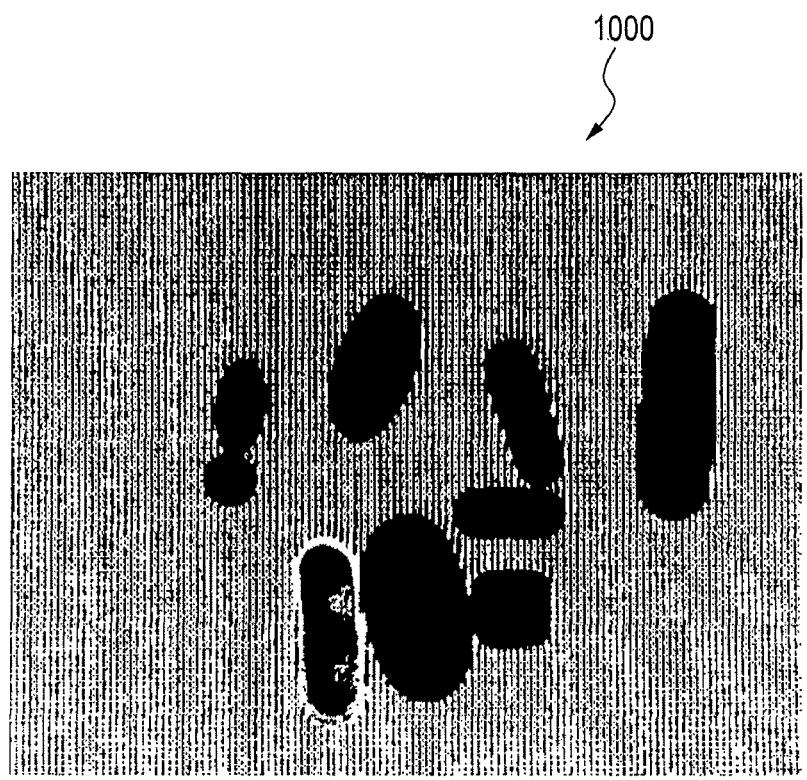
FIG. 10 illustrates a second color binary image, in accordance with the present disclosure.

Similarly, a C2 image is also created, as is illustrated in step 820 of method 800 (of FIG. 8) and in C2 image 1000 of FIG. 10. The C2 image 1000 is created using the same process that the C1 image 900 was created, except the C2 image reflects the presence of C2-colored pixels in the original image 200. In the C2 image 1000, white (binary 1) pixels represent C2-colored pixels, and black (binary 0) pixels represent non-C2-colored pixels. Of course, for both the C1 image 900 and C2 image 1000, different binary color schemes can be used, as long as the schemes are used consistently for both images.

At step 830 of method 800 (returning again to FIG. 8), both the C1 image 900 and the C2 image 1000 are processed using a DILATE operation. As explained above, the DILATE operator thickens or expands the white (binary 1) pixels in both the C1 image 900 and the C2 image 1000. As was explained above in regards to image 500, an ERODE operator can be used in place of the DILATE operator if the binary color scheme of C1 image 900 and C2 image 1000 had been reversed.

Figure 11:
FIG. 11 illustrates a multiple colored background image, in accordance with the present disclosure.
Figure 12:
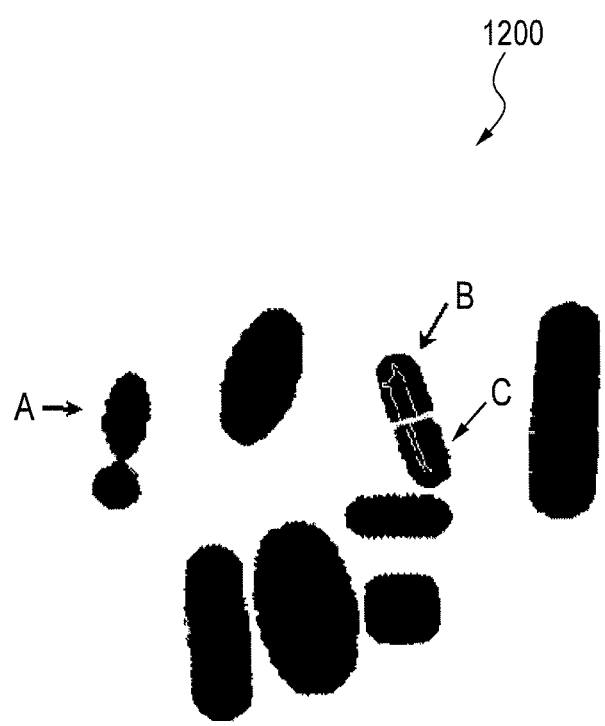
FIG. 12 illustrates a resolved binary image, in accordance with the present disclosure.

At step 840, the C1 image 900 and the C2 image 1000 are intersected to create a new image called the multiple colored background image (or MCBI) 1100, as illustrated in FIG. 11. The combined image is a binary 1 at approximately wherever both C1 image 900 and C2 image 1000 had each been a binary 1. The resulting image 1100 is generally white (binary 1) wherever the background grid had been in the original image 200 and black at the locations of the pills. Importantly, the areas of pills that had previously appeared "chewed in" in both C1 image 900 and C2 image 1000 are no longer "chewed in" in the MCBI 1100. However, because of the DILATE operation, the resolution at the pill boundaries lacks precision in comparison with the EDI 400. Therefore, to improve the resolution of the MCBI 1100, the contours determined at step 330 of method 300 (of FIG. 3) and illustrated in contour image 600 are mapped onto the MCBI 1100 as white (binary 1) lines (step 850). The resolved binary image (RBI) 1200 is illustrated in FIG. 12.

The pills in the RBI 1200 have relatively smooth edges. The "chewed in" contours B and C from the contour image 600 are now filled-in with black (binary 0) pixels so that the capsule is represented by four parts—two for the top half and two for the bottom half—that together match the size and shape of the actually-imaged pill. These four parts are able to be stitched together into a single pill, as explained below.

Additionally, the contour A still bounds two separate pills. This will be remedied, however, by separating the contour A into two contours, as is also explained below. Pill part stitching and pill separation methods may be performed in any order.

Figure 13A:
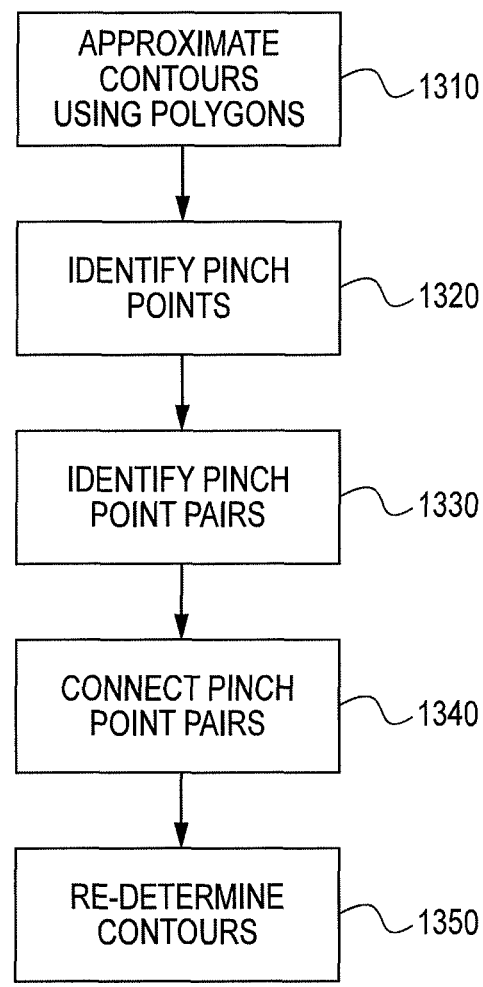
FIGS. 13A, 13B and 13C illustrate a pinch point method, in accordance with the present disclosure.
Figure 13B:
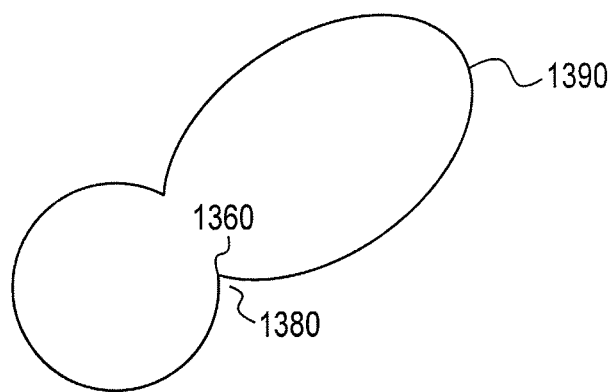
Figure 13C:
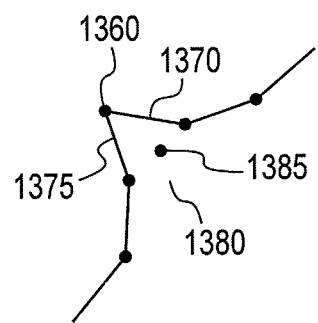

A pinch point method is used for separating touching pills that are bounded by a single contour. The pinch point method 1300 is illustrated in FIG. 13A. At step 1310, contours in the RBI 1200 are approximated by polygons. Algorithms for polygon approximation are well-known. At step 1320, pinch points are identified. A pinch point defines a point in a contour where two pills bounded by the same contour likely intersect. One way to identify a pinch point is to identify points at which polygon line segments are joined at a small angle. For example, a pinch point may be defined as a point at which polygon line segments are joined at an angle less than 100 degrees. The identified pinch points are verified as pinch points by ensuring that pixels within a specified distance of the identified pinch points but outside of the contour are white (i.e., do not include any contour lines). This criteria is illustrated in FIGS. 13B and 13C. In FIG. 13B, an identified pinch point 1360 is illustrated. The pinch point 1360 is located on contour 1390. The pinch point 1360 is at the inside corner of two intersecting polygon line segments 1370, 1375 (as illustrated in FIG. 13C). A genuine pinch point 1360 is characterized by a region 1380 outside of the contour 1390 and between the intersecting polygon line segments 1370, 1375 that includes no contour lines. Thus, a pinch point 1360 can be verified by testing the mid-point 1385 of a line segment connecting the remote ends of the polygon line segments 1370, 1375 bounding the pinch point. If the mid-point 1385 is characterized by white space (i.e., no contour lines present), then the identified pinch point 1360 is verified as a pinch point. If the mid-point 1385 is characterized by dark space (i.e., a contour line is present), then the identified pinch point 1360 is not verified as a pinch point. Other methods may be used to ensure that a sufficient amount of white space abuts the outside region of a contour near an identified pinch point. For example, one method includes testing whether white space exists at a specified distance from the identified pinch point and outside of the contour.

At step 1330 (returning to FIG. 13A), pinch point pairs are identified. If a pinch point pair exists, meaning that two pinch points are identified which face each other and are within a predefined distance of each other (for example, less than 5 mm), then an assumption is made that the pinch point pair most likely indicates the points where two separate pills touch each other. Pinch points are said to face each other if the apexes formed by the intersection of polygon line segments at each pinch point are directed towards each other. Whether pinch points face each other can be tested by determining, for each pinch point, a vector in the direction of the apex, as well as a vector connecting the potential pinch point pair. The vector for each pinch point bisects the angle formed by the intersection of the polygon line segments, but extends in the direction of the apex. Vectors from potential pinch point pairs are compared with each other and with the vector connecting the potential pinch point pair to determine if the vectors are approximately co-linear. This is done by determining the cosine of the angle formed by the intersection of the pinch point vectors with each other and with the connecting vector. A cosine equal to −1 between the pair of pinch point vectors and a cosine equal to −1 between the connecting vector and one of the pinch point vectors indicates that the vectors are co-linear and that the pinch points exactly face each other. A cosine of less than −0.8 for each of these pairwise comparisons is sufficient to indicate that the pinch points face each other. An example pinch point pair is shown in RBI 1200 of FIG. 12, where contour A includes a pinch point pair identifying where the two pills enclosed by contour A touch each other.

At step 1340, the pinch point pairs are connected using a white (binary 1) line. The individual pills previously enclosed by contour A are now separated by a white line, and contours for the pills in RBI 1200 (as modified by the lines connecting pinch points) are re-determined at step 1350.

Figure 14:
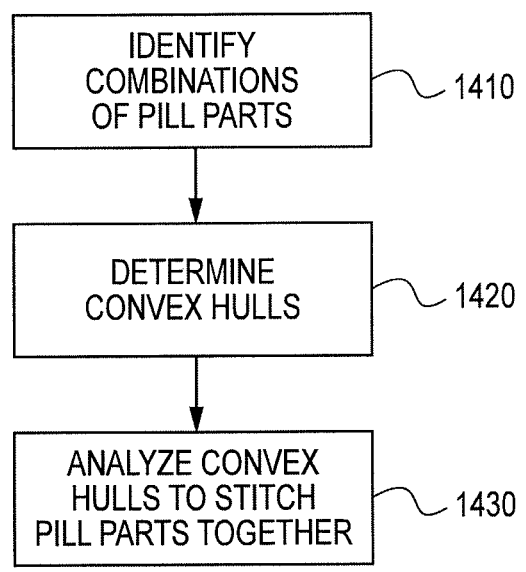
FIG. 14 illustrates a pill part stitching method, in accordance with the present disclosure.

A pill part stitching method is used for combining multiple contours into a single contour for a single pill. The pill part stitching method 1400 is illustrated in FIG. 14. At step 1410, combinations of pill parts are identified. Pill part combinations are determined by identifying pill contours that are within a predefined distance of each other so as to likely be part of a same pill. Each contour that is within the predefined distance of another contour may define a pill part that could be combined with a pill part enclosed by the neighboring contour. Thus, for example, in RBI 1200, there are at least four contours (including contours B and C) that are very close to other contours, and thus could each represent a pill part of one or more pills. For each pill part that is close to another pill part, combinations of pill parts can be formed.

At step 1420, each possible combination of pill parts is analyzed to determine the combination's convex hull. The convex hull of a combination of pill parts can be thought of as the boundary formed by wrapping a rubber band around the combination of contours. Convex hulls can be determined using algorithms that are well-known. At step 1430, an analysis is made to determine whether the convex hull for each combination indicates a likely pill. The analysis is made using heuristics: if the convex hull results in a shape that includes dimensions and shapes that are characteristic of a pill, then the combination of pill parts is determined to represent a single pill.

The method 1400 is applied so that each likely combination of pill parts in RBI 1200 is analyzed. Once actual pill combinations are determined, the convex hull bounding the component pill parts becomes the new contour for the pill.

Figure 15:
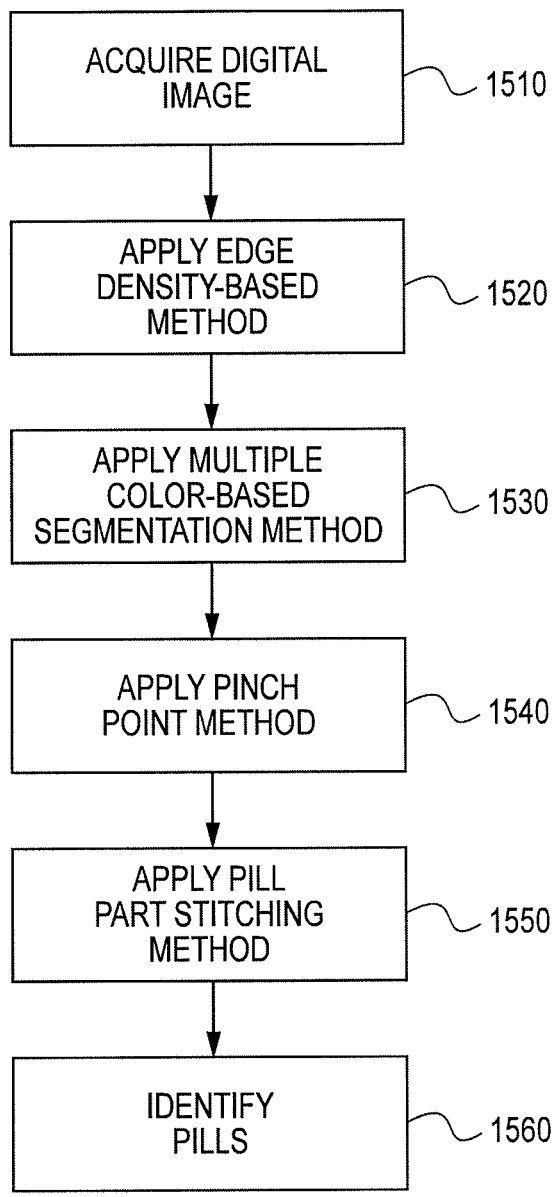
FIG. 15 illustrates a method for identifying pills, in accordance with the present disclosure.

Accordingly, using background 100, the edge density-based method 300, the multiple color-based segmentation approach 800, the pinch point method 1300 and the pill part stitching method 1400, the pixels in the original image 200 are able to be accurately segmented into the correct pills for identification. An embodiment of the improved segmentation process 1500 is illustrated in FIG. 15. First, a digital image of the pills is acquired at step 1510. The digital image represents the pills to be identified and the background 100. The digital image may be acquired using a digital camera. The digital camera must have a resolution sufficient to resolve the individual squares in the background 100. The digital image is framed using the targets 120 in the background 100 so as to ensure that the digital image is aligned and also of a sufficient size to provide the required resolution. A digital image, appropriately framed by the targets 120, that is approximately 1 Mb in size, typically provides sufficient resolution. Of course, a sufficient resolution is dependent upon many factors, including the size and resolution of the background 100 itself, lighting conditions, etc.

Once the digital image is obtained at step 1510, the digital image is processed using a processor and methods 300, 800, 1300 and 1400. At step 1520, the edge density-based method 300 is applied to the digital image. At step 1530, the multiple color-based segmentation approach 800 is applied to the digital image. In the example of method 1500, the pinch point method 1300 is applied next at step 1540, followed by the pill part stitching method 1400 at step 1550. Steps 1540 and 1550 may be reversed in order. By the completion of step 1550, the pills in the digital image have each been accurately defined by a contour. The contours for each pill are then combined with the color information from the original digital image to facilitate pill identification at step 1560. Pills are identified based on the shape and size of their contours and the color schemes, scoring patterns and imprints of the pills. Pill identification results from comparing data representative of the imaged pills to data collected in a database, for example.

Figure 16:
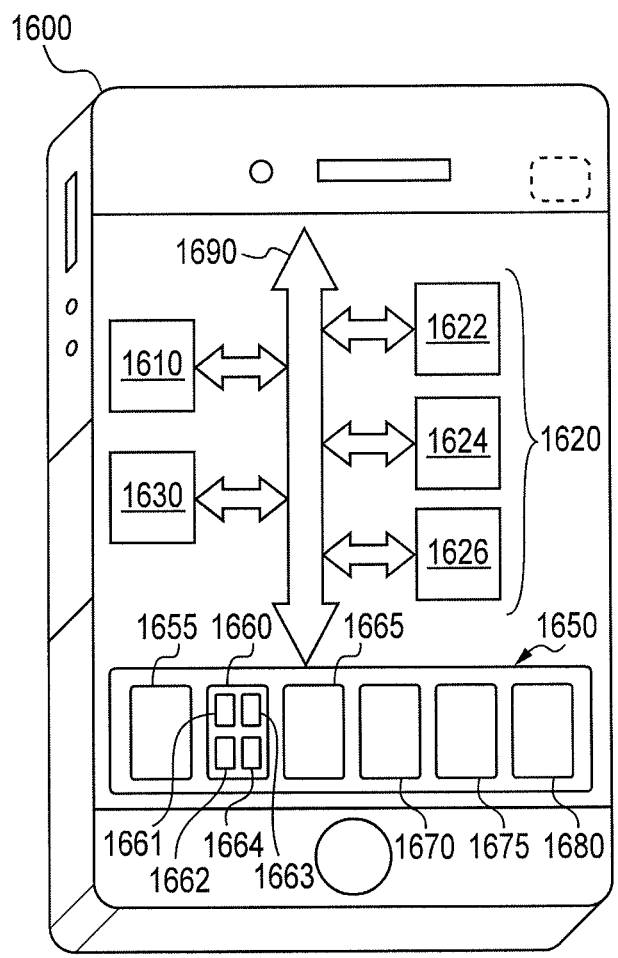
FIG. 16 illustrates a mobile device system for identifying pills, in accordance with the present disclosure.

Method 1500 is thus performed using the background 100, a digital camera, a processor and a database. A smartphone or other mobile device may be used to provide the digital camera, processor and database. For example, FIG. 16 illustrates a mobile device 1600, such as a smartphone, that includes a processing system, camera and memory. The mobile device 1600 generally comprises a central processing unit (CPU) 1610, such as a microprocessor, a digital signal processor, or other programmable digital logic devices, which communicates with various input/output (I/O) devices 1620 over a bus or other interconnect 1690. The input/output devices 1620 include a digital camera 1622 for inputting digital images of pills on the background 100. The input/output devices may also include a user interface 1624 to display pill identification results to a user, and a transmitter 1626 for transmission of the pill identification results to a remote location. A memory device 1630 communicates with the CPU 1610 over bus or other interconnect 1690 typically through a memory controller. The memory device 1630 may include RAM, a hard drive, a FLASH drive or removable memory for example. The memory device 1630 includes one or more databases. The CPU 1610 implements the method 1500 as applied to the digital image obtained by camera 1622. The CPU 1610 processes the digital image, compares the processed pill results to one or more pill databases, at least one of which is stored in the memory device 1630, and then outputs pill identification results via the user interface 1624 and/or the transmitter 1626. If desired, the memory device 1630 may be combined with the processor, for example CPU 1610, as a single integrated circuit.

Methods 300, 800, 1300, 1400 and 1500 are implemented as either hardware or software, or a combination thereof. The mobile device 1600 includes a system 1650 for implementing methods 300, 800, 1300, 1400 and 1500. The system 1650 includes an initial contour estimation module 1655, a pill part addition module 1660, a pinch point module 1665, a pill stitching module 1670, a final contour estimation module 1675 and a pill identification module 1680. The initial contour estimation module 1655 is configured to implement method 300. The pill part addition module 1660 is configured to implement method 800, and includes a number of sub-modules. For example, the pill part addition module 1660 includes a first color binary image module 1661 for generating a C1 image (as described above) and a second color binary image module 1662 for generating a C2 image (also as described above). The first and second color binary image modules 1661, 1662 may be combined into a single module. The pill part addition module 1660 also includes an intersecting module 1663 for intersecting the C1 and C2 images to create the multiple colored background image, and a combining module 1664 for combining the multiple colored background image with the edge density image to create the refined binary image (also as explained above). The pinch point module 1665 is configured to implement method 1300. The pill stitching module 1670 is configured to implement method 1400. The final contour estimation module 1675 is configured to combine the outputs of the pinch point module 1665 and the pill stitching module 1670 (i.e., methods 1300 and 1400) to determine the contours of each pill in a digital image. The pill identification module 1680 uses the contour information generated in module 1675 to identify the pills in the digital image. The pill identification module 1680 can also use additional information, such as color schemes, scoring and imprints, to assist in pill identification. The modules in system 1650 may be combined or further separated into additional sub-modules, as desired. As an example, system 1650 and the modules used within system 1650 may be implemented as an application on a smartphone.

The above description and drawings are only to be considered illustrative of specific embodiments, which achieve the features and advantages described herein. Modifications and substitutions to specific process conditions can be made. Accordingly, the embodiments of the invention are not considered as being limited by the foregoing description and drawings, but is only limited by the scope of the appended claims.

What is claimed as new and desired to be protected by Letters Patent of the United States is:

1. A method of identifying a contour of one or more pills, the method comprising:
   receiving a digital image representing one or more pills on a background grid, the background grid organized as a grid of alternating-colored shapes;
   using the grid of alternating-colored shapes to determine an initial estimation of contours for the imaged pills, each contour enclosing a pill part;
   creating a first refined estimation of contours by separating contours that enclose multiple pills in the initial estimation of contours into individual contours that each only enclose a single pill;
   creating a second refined estimation of contours by combining pill parts representing a single pill in the initial estimation of contours into a single contour for a pill represented by multiple pill parts; and
   combining the first and second refined estimation of contours to create an improved estimation of contours.

2. The method of claim 1, wherein the step of receiving a digital image further comprises receiving a digital image that includes pills randomly arranged with respect to each other.

3. The method of claim 1, wherein the step of receiving a digital image further comprises using a two-colored background.

4. The method of claim 1, wherein the step of receiving a digital image further comprises using a three-colored background.

5. The method of claim 1, wherein the step of receiving a digital image further comprises using a background of at least four colors.

6. The method of claim 1, wherein the step of using the grid of alternating-colored shapes to determine an initial estimation of contours further comprises using an edge density-based approach to determine the initial estimation of contours.

7. The method of claim 6, wherein the edge density-based approach comprises:
   finding edges in the digital image; joining edges to nearby edges to remove the edges in the background grid; and
   determining the initial estimation of contours from the edges that remain after nearby edges are joined.

8. The method of claim 1, further comprising the step of using the grid of alternating colored shapes to create a refined binary image that adds additional pill parts to the pill parts enclosed by the initial estimation of contours;
   wherein the step of creating a first refined estimation of contours is performed by separating contours that enclose multiple pills in the refined binary image into individual contours that each only enclose a single pill; and wherein the step of creating a second refined estimation of contours is performed by combining pill parts representing a single pill in the initial estimation of contours into a single contour for a pill represented by multiple pill parts.

9. The method of claim 8, wherein the step of using the grid of alternating-colored shapes to create a refined binary image further comprises:

determining a first color binary image from the digital image that represents the presence and absence of a first color in the digital image, the first color being one of the colors in the background grid;

determining a second color binary image from the digital image that represents the presence and absence of a second color in the digital image, the second color being one of the colors in the background grid;

modifying the first and second color binary images by expanding regions in the first and second color binary images that represent the presence of the first and second color in the first and second color binary images, respectively;

intersecting the modified first and second color binary images to create a multiple colored background image; and combining the multiple colored background image with the initial estimation of contours to create the refined binary image.

10. The method of claim 8, wherein the step of creating a first refined estimation of contours further comprises:

approximating each contour in the refined binary image with a polygon;

determining pinch points where consecutive polygon line segments are connected at an angle that is less than a predefined maximum angle, the angle forming an apex;

verifying the pinch points by determining that no contour lines exist outside of each polygon within a first predefined maximum distance of the determined pinch points;

determining pairs of pinch points that are less than a second predefined maximum distance from each other and whose apexes are directed towards each other;

inserting an edge in the form of a line segment between each pair of pinch points; and re-determining contours for the refined binary image after the edges are inserted between the pairs of pinch points, the first refined estimation of contours being comprised of the re-determined contours.

11. The method of claim 10, wherein the predefined maximum angle is less than 100 degrees.

12. The method of claim 10, wherein the first predefined maximum distance is a distance from each determined pinch point to a midpoint of a line segment extending between remote endpoints of the consecutive polygon line segments that flank each determined pinch point.

13. The method of claim 10, wherein the second predefined maximum distance is 5 mm.

14. The method of claim 10, wherein the determining pairs of pinch points step includes determining whether the apexes of pinch points are directed towards each other by representing each apex as a vector, determining a third vector connecting the apexes of a potential pair of pinch points, and determining if the cosine of between the apex vectors is less than −0.8 and the cosine between the vector connecting the apexes and one of the apex vectors is less than −0.8.

15. The method of claim 8, wherein the step of creating a second refined estimation of contours further comprises:

identifying combinations of pill parts in the refined binary image that potentially represent single pills;

finding a convex hull for each identified combination of pill parts;

analyzing the convex hulls to determine which combinations of pill parts are likely to represent single pills; and for each combination of pill parts that is likely to represent a single pill, removing contours internal to the convex hull and replacing the convex hull with a new contour, the second refined estimation of contours being comprised of the new contours.

16. The method of claim 15, wherein the step of analyzing the convex hulls comprises comparing the sizes and shapes of the convex hulls with the sizes and shapes of known pills.

17. A method of determining contours for pills in a digital image, the method comprising:

receiving a digital image representing one or more pills on a background grid, the background grid organized in an alternating pattern of at least two colors of squares;

using the grid of alternating-colored squares to determine an initial estimation of contours for the imaged pills, each contour enclosing a pill part;

using the grid of alternating-colored squares to create a refined binary image that adds additional pill parts to the pill parts enclosed by the initial estimation of contours; and creating a first improved estimation of contours by combining pill parts representing a single pill in the refined binary image into a single contour for a pill represented by multiple pill parts.

18. The method of claim 17, wherein the step of using the grid of alternating-colored squares to determine an initial estimation of contours further comprises:

finding edges in the digital image; joining edges to nearby edges to remove the edges in the background grid; and determining the initial estimation of contours from the edges that remain after nearby edges are joined.

19. The method of claim 17, wherein the step of using the grid of alternating-colored squares to create a refined binary image further comprises:

determining a first color binary image from the digital image that represents the presence and absence of a first color in the digital image, the first color being one of the colors in the background grid;

determining a second color binary image from the digital image that represents the presence and absence of a second color in the digital image, the second color being one of the colors in the background grid;

modifying the first and second color binary images by expanding regions in the first and second color binary images that represent the presence of the first and second color in the first and second color binary images, respectively;

intersecting the modified first and second color binary images to create a multiple colored background image; and combining the multiple colored background image with the initial estimation of contours to create the refined binary image.

20. The method of claim 17, wherein the step of creating an improved estimation of contours further comprises:

identifying combinations of pill parts in the refined binary image that potentially represent single pills;

finding a convex hull for each identified combination of pill parts;

analyzing the convex hulls to determine which combinations of pill parts are likely to represent single pills; and for each combination of pill parts that is likely to represent a single pill, removing contours internal to the convex hull and replacing the convex hull with a new contour, the first improved estimation of contours being comprised of the new contours.

21. The method of claim 17, further comprising:

creating a second improved estimation of contours by separating contours that enclose multiple pills in the refined binary image into individual contours that each only enclose a single pill; and combining the first and second improved estimation of contours to create an combined improved estimation of contours.

22. The method of claim 21, wherein the step of creating a first refined estimation of contours further comprises:

approximating each contour in the refined binary image with a polygon;

determining pinch points where consecutive polygon line segments are connected at an angle that is less than a predefined maximum angle, the angle forming an apex;

verifying the pinch points by determining that no contour lines exist outside of each polygon within a first predefined maximum distance of the determined pinch points;

determining pairs of pinch points that are less than a second predefined maximum distance from each other and whose apexes are directed towards each other;

inserting an edge in the form of a line segment between each pair of pinch points; and re-determining contours for the refined binary image after the edges are inserted between the pairs of pinch points, the second improved estimation of contours being comprised of the re-determined contours.

23. The method of claim 22, wherein the first predefined maximum distance is a distance from each determined pinch point to a midpoint of a line segment extending between remote endpoints of the consecutive polygon line segments that flank each determined pinch point.

24. A method of using a mobile device to identify a size and shape of one or more pills, the method comprising:

using a mobile device to create a digital image of one or more pills on a background grid, the background grid organized as a grid of alternating-colored shapes;

using the grid of alternating-colored shapes to determine an initial estimation of contours for the imaged pills, each contour enclosing a pill part;

using the grid of alternating-colored shapes to create a refined binary image that adds additional pill parts to the pill parts enclosed by the initial estimation of contours;

creating a first refined estimation of contours by separating contours that enclose multiple pills in the refined binary image into individual contours that each only enclose a single pill;

creating a second refined estimation of contours by combining pill parts representing a single pill in the refined binary image into a single contour for a pill represented by multiple pill parts;

combining the first and second refined estimation of contours to create an improved estimation of contours; and determining a size and shape of each pill in the digital image based on the corresponding size and shape of the contours in the improved estimation of contours.

25. The method of claim 24, wherein the step of using a mobile device to create a digital image further comprises creating the digital image by aligning the background grid using targets on the background grid.

26. The method of claim 24, wherein the step of using the grid of alternating-colored shapes to determine an initial estimation of contours further comprises using an edge density-based approach to determine the initial estimation of contours.

27. The method of claim 26, wherein the edge density-based approach comprises:

finding edges in the digital image; joining edges to nearby edges to remove the edges in the background grid; and determining the initial estimation of contours from the edges that remain after nearby edges are joined.

28. The method of claim 24, wherein the step of using the grid of alternating-colored shapes to create a refined binary image further comprises:

determining a first color binary image from the digital image that represents the presence and absence of a first color in the digital image, the first color being one of the colors in the background grid;

determining a second color binary image from the digital image that represents the presence and absence of a second color in the digital image, the second color being one of the colors in the background grid;

modifying the first and second color binary images by expanding regions in the first and second color binary images that represent the presence of the first and second color in the first and second color binary images, respectively;

intersecting the modified first and second color binary images to create a multiple colored background image; and combining the multiple colored background image with the initial estimation of contours to create the refined binary image.

29. The method of claim 24, wherein the step of creating a first refined estimation of contours further comprises:

approximating each contour in the refined binary image with a polygon;

determining pinch points where consecutive polygon line segments are connected at an angle that is less than a predefined maximum angle, the angle forming an apex;

verifying the pinch points by determining that no contour lines exist outside of each polygon within a first predefined maximum distance of the determined pinch points;

determining pairs of pinch points that are less than a second predefined maximum distance from each other and whose apexes are directed towards each other;

inserting an edge in the form of a line segment between each pair of pinch points; and re-determining contours for the refined binary image after the edges are inserted between the pairs of pinch points, the first refined estimation of contours being comprised of the re-determined contours.

30. The method of claim 24, wherein the step of creating a second refined estimation of contours further comprises:

identifying combinations of pill parts in the refined binary image that potentially represent single pills;

finding a convex hull for each identified combination of pill parts;

analyzing the convex hulls to determine which combinations of pill parts are likely to represent single pills; and for each combination of pill parts that is likely to represent a single pill, removing contours internal to the convex hull and replacing the convex hull with a new contour, the second refined estimation of contours being comprised of the new contours.

31. The method of claim 30, wherein the step of analyzing the convex hulls comprises comparing the sizes and shapes of the convex hulls with the sizes and shapes of known pills.

32. The method of claim 24, further comprising determining an identity of each pill in the digital image using the determined size and shape of each pill.

33. The method of claim 32, wherein at least one of each pill's color scheme, scoring and imprint pattern is used with the determined size and shape of each pill to determine the identity of each pill.

34. The method of claim 32, further comprising displaying on the mobile device the identity of each pill in the digital image.

35. A system of identifying contours for pills, comprising:
a background grid organized as a grid of alternating-colored shapes;
a digital camera;
a processor for receiving from the digital camera a digital image representing one or more pills on the background grid and process the digital image in order to identify contours for each pill in the digital image;
a pinch point module for separating contours that enclose multiple pills into individual contours that each only enclose a single pill;
a pill stitching module for combining pill parts representing a single pill into a single contour for a pill represented by multiple pill parts; and
a memory for storing the identified contours.

36. The system of claim 35, wherein the background grid includes a background of at least two colors.

37. The system of claim 35, further comprising:
an initial contour estimation module for determining an initial estimation of contours for the imaged pills, each contour enclosing a pill part;
a pill part addition module for using the background grid to create a refined binary image that adds additional pill parts to the pill parts enclosed by the initial estimation of contours; and
a final contour estimation module for combining a first refined estimation of contours and a second refined estimation of contours to create an improved estimation of contours, wherein the first refined estimation of contours is generated by the pinch point module by separating contours that enclose multiple pills in the refined binary image, and wherein the second refined estimation of contours is generated by the pill stitching module by combining pill parts representing a single pill in the refined binary image.

38. The system of claim 37, wherein the initial contour estimation module is configured to determine the initial estimation of contours by using an edge density-based approach.

39. The system of claim 37, wherein the initial contour estimation module is for determining the initial estimation of contours by:
finding edges in the digital image;
joining edges to nearby edges to remove the edges in the background grid; and
determining the initial estimation of contours from the edges that remain after nearby edges are joined.

40. The system of claim 37, wherein the pill part addition module comprises:
a first color binary image module for determining a first color binary image from the digital image that represents the presence and absence of a first color in the digital image, the first color being one of the colors in the background grid;
a second color binary image module for determining a second color binary image from the digital image that represents the presence and absence of a second color in the digital image, the second color being one of the colors in the background grid;
an intersecting module for intersecting the modified first and second color binary images to create a multiple colored background image; and
a combining module for combining the multiple colored background image with the initial estimation of contours to create the refined binary image.

41. The system of claim 37, wherein the pinch point module creates a first refined estimation of contours by:
approximating each contour in the refined binary image with a polygon;
determining pinch points where consecutive polygon line segments are connected at an angle that is less than a predefined maximum angle, the angle forming an apex;
verifying the pinch points by determining that no contour lines exist outside of each polygon within a first predefined maximum distance of the determined pinch points;
determining pairs of pinch points that are less than a second predefined maximum distance from each other and whose apexes are directed towards each other;
inserting an edge in the form of a line segment between each pair of pinch points; and
re-determining contours for the refined binary image after the edges are inserted between the pairs of pinch points, the first refined estimation of contours being comprised of the re-determined contours.

42. The system of claim 37, wherein the pill stitching module creates a second refined estimation of contours by:
identifying combinations of pill parts in the refined binary image that potentially represent single pills;
finding a convex hull for each identified combination of pill parts;
analyzing the convex hulls to determine which combinations of pill parts are likely to represent single pills; and
for each combination of pill parts that is likely to represent a single pill, removing contours internal to the convex hull and replacing the convex hull with a new contour, the second refined estimation of contours being comprised of the new contours.

43. A mobile device for identifying pills, comprising:
a digital camera;
a processor for receiving from the digital camera a digital image representing one or more pills on a background grid organized as a grid of alternating-colored shapes and process the digital image in order to identify each pill in the digital image;
a pinch point module for separating contours that enclose multiple pills into individual contours that each only enclose a single pill;
a pill stitching module for combining pill parts representing a single pill into a single contour for a pill represented by multiple pill parts; and
a memory for storing the identity of each pill.

44. The mobile device of claim 43, further comprising a user interface for displaying to a user of the mobile device the identity of each pill.

45. The mobile device of claim 43, further comprising a transmitter for transmitting the identity of each pill to a remote location.

46. The mobile device of claim 43, wherein the background grid includes a background of at least two colors.

47. The mobile device of claim 43, further comprising:
an initial contour estimation module for determining an initial estimation of contours for the imaged pills, each contour enclosing a pill part;
a pill part addition module for using the background grid to create a refined binary image that adds additional pill parts to the pill parts enclosed by the initial estimation of contours;
a final contour estimation module for combining a first refined estimation of contours and a second refined estimation of contours to create an improved estimation of contours, wherein the first refined estimation of contours is generated by the pinch point module by separating contours that enclose multiple pills in the refined binary image, and wherein the second refined estimation of contours is generated by the pill stitching module by combining pill parts representing a single pill in the refined binary image; and
a pill identification module for identifying each pill in the digital image using the contours in the improved estimation of contours.

48. The mobile device of claim 47, wherein the initial contour estimation module is configured to determine the initial estimation of contours by using an edge density-based approach.

49. The mobile device of claim 47, wherein the initial contour estimation module is for determining the initial estimation of contours by:
finding edges in the digital image;
joining edges to nearby edges to remove the edges in the background grid; and
determining the initial estimation of contours from the edges that remain after nearby edges are joined.

50. The mobile device of claim 47, wherein the pill part addition module comprises:
a first color binary image module for determining a first color binary image from the digital image that represents the presence and absence of a first color in the digital image, the first color being one of the colors in the background grid;
a second color binary image module for determining a second color binary image from the digital image that represents the presence and absence of a second color in the digital image, the second color being one of the colors in the background grid;
an intersecting module for intersecting the modified first and second color binary images to create a multiple colored background image; and
a combining module for combining the multiple colored background image with the initial estimation of contours to create the refined binary image.

51. The mobile device of claim 47, wherein the pinch point module creates a first refined estimation of contours by:
approximating each contour in the refined binary image with a polygon;
determining pinch points where consecutive polygon line segments are connected at an angle that is less than a predefined maximum angle, the angle forming an apex;
verifying the pinch points by determining that no contour lines exist outside of each polygon within a first predefined maximum distance of the determined pinch points;
determining pairs of pinch points that are less than a second predefined maximum distance from each other and whose apexes are directed towards each other;
inserting an edge in the form of a line segment between each pair of pinch points; and
re-determining contours for the refined binary image after the edges are inserted between the pairs of pinch points, the first refined estimation of contours being comprised of the re-determined contours.

52. The mobile device of claim 47, wherein the pill stitching module creates a second refined estimation of contours by:
identifying combinations of pill parts in the refined binary image that potentially represent single pills;
finding a convex hull for each identified combination of pill parts;
analyzing the convex hulls to determine which combinations of pill parts are likely to represent single pills; and
for each combination of pill parts that is likely to represent a single pill, removing contours internal to the convex hull and replacing the convex hull with a new contour, the second refined estimation of contours being comprised of the new contours.

53. The mobile device of claim 47, wherein the pill identification module uses the contours in the improved estimation of contours to determine the size and shape of each pill.

54. The mobile device of claim 53, wherein the pill identification module further uses at least one of each pill's color scheme, scoring and imprint pattern with the determined size and shape of each pill to determine the identity of each pill.

* * * * *